(12) United States Patent
Chavez et al.

(10) Patent No.: US 11,781,832 B2
(45) Date of Patent: Oct. 10, 2023

(54) OPTICAL SIGHT WITH REINFORCED FRAME

(71) Applicant: BUSHNELL INC., Overland Park, KS (US)

(72) Inventors: Alejandro Chavez, Overland Park, KS (US); Travis C. Overfelt, Lee's Summit, MO (US); Kamille C. Eusebio, Cumming, GA (US)

(73) Assignee: Bushnell Inc., Overland Park, KS (US)

( * ) Notice: Subject to any disclaimer, the term of this patent is extended or adjusted under 35 U.S.C. 154(b) by 34 days.

(21) Appl. No.: 17/384,372

(22) Filed: Jul. 23, 2021

(65) Prior Publication Data

US 2022/0026175 A1  Jan. 27, 2022

Related U.S. Application Data

(60) Provisional application No. 63/077,484, filed on Sep. 11, 2020, provisional application No. 63/056,186, filed on Jul. 24, 2020.

(51) Int. Cl.
*F41G 1/30* (2006.01)
*G02B 23/16* (2006.01)

(52) U.S. Cl.
CPC .............. *F41G 1/30* (2013.01); *G02B 23/16* (2013.01)

(58) Field of Classification Search
CPC .................................. F41G 1/30; G02B 23/16
See application file for complete search history.

(56) References Cited

U.S. PATENT DOCUMENTS

| | | | | |
|---|---|---|---|---|
| 8,215,050 | B2 * | 7/2012 | Elpedes | F41G 1/14 42/131 |
| 9,869,526 | B1 | 1/2018 | Cheng et al. | |
| 10,175,029 | B2 * | 1/2019 | Teetzel | F41G 1/30 |
| 10,473,427 | B1 * | 11/2019 | Sereday | F41C 33/0263 |
| 10,563,955 | B2 * | 2/2020 | Pniel | F41G 1/16 |
| 11,530,901 | B2 * | 12/2022 | Brewer | F41G 1/14 |
| 2010/0083554 | A1 * | 4/2010 | Elpedes | F41G 1/30 42/130 |
| 2014/0109456 | A1 * | 4/2014 | Jung | F41G 1/30 42/113 |
| 2015/0052796 | A1 | 2/2015 | Baker et al. | |
| 2015/0059225 | A1 * | 3/2015 | Huang | F41G 1/30 42/113 |
| 2015/0198415 | A1 * | 7/2015 | Campean | F41G 1/30 42/137 |
| 2017/0205194 | A1 * | 7/2017 | Teetzel | F41G 1/26 |
| 2019/0360777 | A1 * | 11/2019 | Grace | F41G 1/345 |

(Continued)

OTHER PUBLICATIONS

Communication under Rule 71(3) EPC in related European Application No. EP21020384.0, dated Dec. 20, 2022.

(Continued)

*Primary Examiner* — Joshua E Freeman
(74) *Attorney, Agent, or Firm* — Walter M. Egbert, III; Richard J. Brown; Reed Smith LLP

(57) ABSTRACT

Optical sights for mounting on a firearm are provided, each of the sights having a base defining a barrel end and a rear end; a frame extending upwardly from the base at the barrel end and defining an opening; an optical element received in the opening; and an illumination device operable to display an aiming point on the optical element to generate said aiming point.

24 Claims, 18 Drawing Sheets

(56) References Cited

U.S. PATENT DOCUMENTS

| | | | |
|---|---|---|---|
| 2020/0200507 A1* | 6/2020 | Curry | F41G 1/30 |
| 2020/0232759 A1 | 7/2020 | York et al. | |
| 2021/0156645 A1* | 5/2021 | Heath | F41G 1/033 |
| 2021/0156646 A1* | 5/2021 | Schulte | F41G 1/30 |
| 2021/0172704 A1* | 6/2021 | Nackel | G02B 23/105 |
| 2021/0207928 A1* | 7/2021 | Brewer | F41G 1/14 |
| 2021/0222997 A1* | 7/2021 | Sessions | F41G 1/30 |
| 2021/0325146 A1* | 10/2021 | Thomele | F41G 11/005 |
| 2021/0333067 A1* | 10/2021 | Kennedy | G02B 5/286 |

OTHER PUBLICATIONS

English translation of First Office Action in related Chinese Application No. 202110846324.7, dated Nov. 30, 2022.

* cited by examiner

OPTICAL SIGHT WITH REINFORCED FRAME

CROSS-REFERENCE TO RELATED APPLICATIONS

This application claims the benefit of U.S. Provisional Patent Application No. 63/056,186, filed Jul. 24, 2020; and also claims the benefit of U.S. Provisional Patent Application No. 63/077,484, filed Sep. 11, 2020, the disclosures of which are incorporated by reference herein.

FIELD OF TECHNOLOGY

The present disclosure relates to optical aiming devices and, in particular, to reflex sights.

BACKGROUND

Reflex sights, or reflector sights, are optical sights that are commonly used with firearms, such as handguns and small arms. Reflex sight are also used with surveying equipment, optical telescopes and camera viewfinder. Reflex sights include a partially reflecting optical element, such as a lens or flat glass element that allows the user to view a target and an illuminated aiming mark or reticle pattern superimposed on the field of view. In a reflex sight commonly referred to as a "red-dot sight," the aiming mark is typically generated by a small light emitting diode (LED) at the focal point of the lens, which is typically treated with a dichroic coating to selectively reflect the wavelength of the illumination. In reflex sights including a flat glass element, the aiming mark is generated by an illumination source directed through collimating optics toward the flat glass element.

During operation of the instrument with a reflex sight, the user may encounter adverse conditions that may impede proper functioning of the sight. For example, the optical element may be damaged by an impact, scratches, or contaminants such as moisture or dirt. The LED may be non-functional due to damage, malfunction, or lack of charged batteries. Thus there is a need for an improved reflex sight having features that allow users to maintain operation of their firearms and other instruments.

SUMMARY

An aspect of the present disclosure provides an optical reflex sight for mounting on a firearm, the sight having a base defining a barrel end and a rear end; a frame extending upwardly from the base at the barrel end and defining an opening, an optical element received in the opening; and an illumination device operable to display an aiming point on the optical element to generate said aiming point; wherein the frame comprises upstanding side walls and a top wall comprising an upper surface, a lower surface that contacts the optical element and one or more cavities within the top wall. The one or more cavities provide for protecting the optical element from stress or shocks in the case of an impact.

Embodiments of the optical reflex sight include the following, alone or in any combination.

The optical sight wherein the frame defines upstanding side walls, a crossbar and an upper surface, the crossbar and the upper surface defining a cavity therebetween.

The optical wherein the upper surface of the frame defines a curved, faceted or triangular configuration.

The optical sight wherein the cavity defines a center height greater than the height of the side portions.

The optical sight wherein the cavity is filled with rubber or urethane.

The optical sight wherein the frame defines upstanding side walls, and a crossbar extending between the side walls and defines a top surface of the frame; and a frame hood for mounting over the top surface of the frame, the frame hood and the top surface defining a cavity therebetween.

The optical sight wherein the frame hood further comprises an arched internal wall to distribute an impact load to the side walls.

The optical sight wherein the outer surface of the frame hood defines a dome-shaped, convex, pyramidal, or blister shape.

The optical sight wherein the hood is fabricated of plastic or metal.

The optical sight wherein the hood is secured to the top surface of the frame by interference fit, glue or welding.

The optical sight wherein the frame comprises a pair of side walls extending upward from the base comprising a forward wall portion having a first width and a rear wall portion having a second width, the second width smaller than the first width; and an upper wall extending between the side walls and defining a flat upper portion and a curved lower portion.

The optical sight wherein the upper wall extends towards the barrel end to define a hood adapted to partially shield the optical element.

The optical sight wherein the rear wall portion has a shallower slope than the forward wall portion.

The optical sight further comprising an iron sight comprising a forward post sight mounted at the barrel end of the base; and a rear sight defined by a channel recessed in an upper surface of the base at the rear end of the base and aligned with the forward post sight.

The optical sight further comprising a hood adapted to removably cover a rear-facing side of the optical element and the illumination device, the hood comprising a transparent panel for viewing the optical element therethrough.

The optical sight wherein the hood further comprises an iron sight.

The optical sight wherein the iron sight is disposed inside the transparent panel.

The optical sight wherein the iron sight is disposed outside the transparent panel.

The optical sight wherein the iron sight is substantially aligned with the channel of the rear sight.

The optical sight wherein the hood is removably attached to the frame by screws and the hood is removably attached to the base by cam locks.

The optical sight wherein the forward post sight is removable from the base.

The optical sight wherein the forward post sight is secured to the base by screws.

The optical sight further comprising an ambient light sensor controlling the brightness of the illumination device and an optical fiber connected to the sensor and having an inlet at the barrel end of the base.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
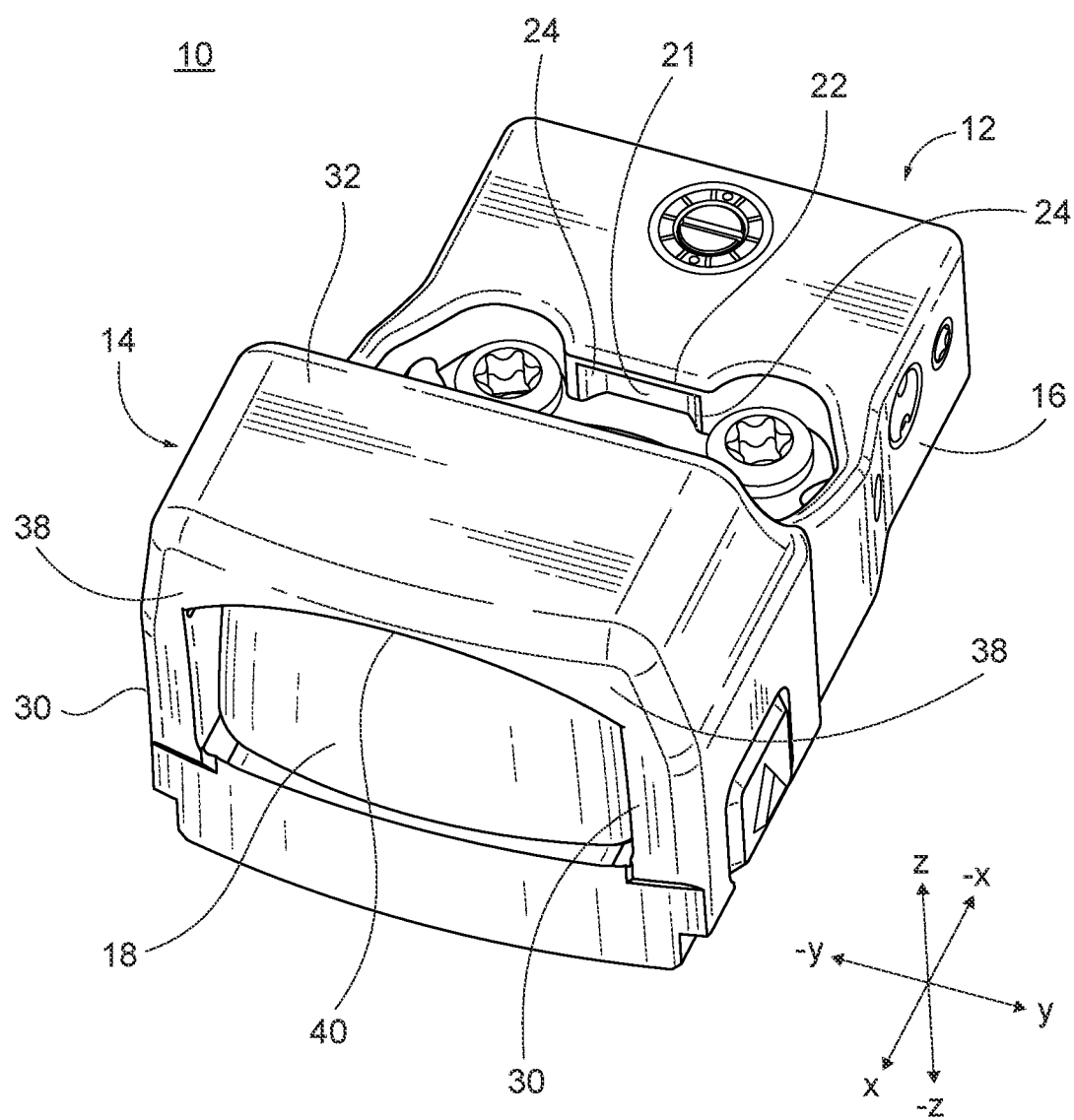
FIG. 1 is a top perspective view from the barrel end of a reflex sight in accordance with an exemplary embodiment of the disclosed subject matter.

Particular embodiments and their detailed construction and operation are described herein. The embodiments described herein are set forth by way of illustration only and not limitation. Throughout the specification, reference to "one embodiment," "an embodiment," or "some embodiments" are not necessarily all referring to the same embodiment. The described features, structures, characteristics, and methods of operation may be practiced in isolation or combined in any suitable manner, and can be practiced without one or more of the specific details or with other methods, components, materials, or the like. In other instances, well-known structures, materials, or methods of operation are not shown or not described in detail to avoid obscuring more pertinent aspects of the embodiments.

FIG. 1-8 illustrate a reflex sight 10 in accordance with an exemplary embodiment, for mounting to a handgun or other firearm (not shown). For reference purposes only, the 'X' direction is designated a forward/barrel direction, and the '−X' direction designated a rearward direction. The 'Z' direction is designated an upward direction, and the '−Z' direction is designated a downward direction. The 'Y' direction is designated a 'left' or 'port' direction, and the '−Y' direction is designated a 'right' or 'starboard' direction.

Reflex sight 10 includes a body 12 that serves as a housing for electronics, power supply, such as a battery 56, mounting structure for mounting on a firearm, an illumination device 20 such as an LED, and other devices. Body 12 includes an upwardly extending frame 14 forming a loop with a lower base portion 16 of body 12. In some embodiments, the body 12 including the frame 14 is integrally formed of one-piece construction from metal, such as aluminum. In some embodiments, the body is fabricated from 6000 Series die cast aluminum.

Figure 8:
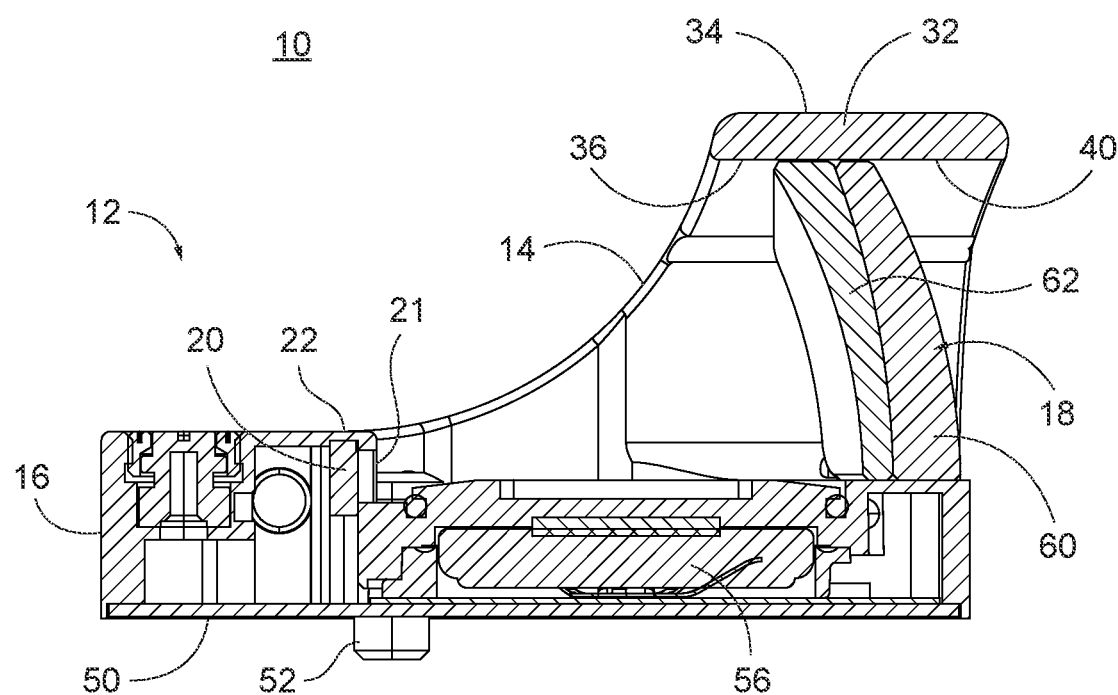
FIG. 8 is a cross-sectional view of the reflex sight of FIG. 1, taken through line 8-8 of FIG. 2.

As illustrated in FIG. 8, an optical element 18 is mounted in a generally upright position in a forward portion of frame 14, providing a viewing window for a target field of view. In some embodiments, optical element 18 includes a doublet lens having a first lens 60 and a second lens 62. Light emitted from the illumination device 20 directed at a focal point rearward of lens 18 and is reflected rearward toward the user's eye by a dichroic reflection layer or coating of at least one of lenses 60 and 62 as collimated light, so that the user perceives the reflected light as an illuminated aiming mark superimposed on the field of view at infinite distance.

FIG. 1 illustrates the window 21 of the illumination device 20, which is seated in a recessed mounting in the base portion 16 of housing 12. The window 21 is surrounded by a hood 22 on an upper portion and angled side walls 24 on the side of the window 21. The window 21 will also have EXO Barrier™ lens coating to protect against the elements and scratches.

Figure 4:
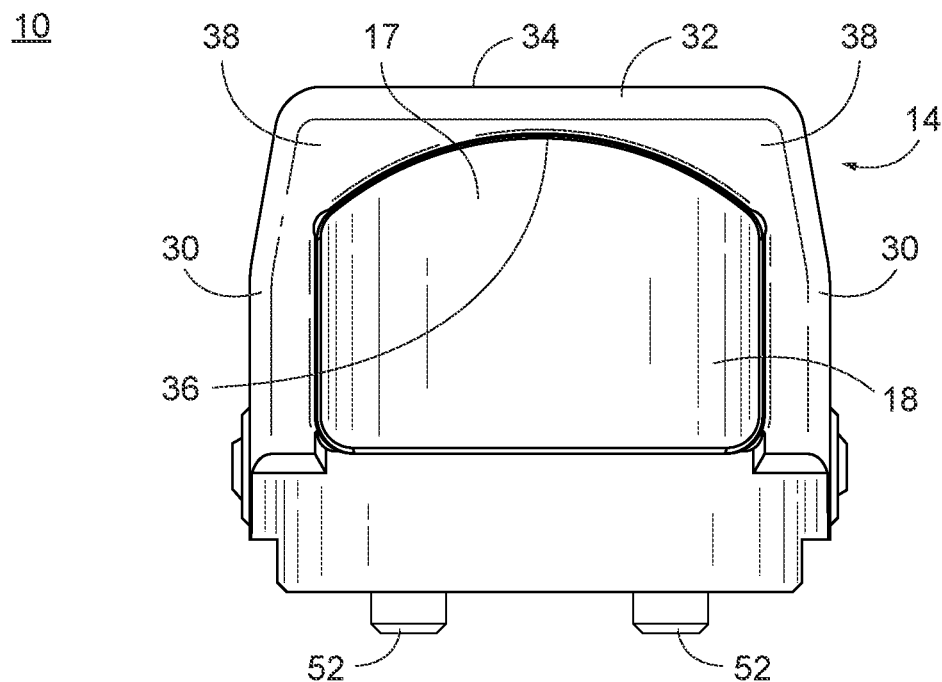
FIG. 4 is an elevation end view from the barrel end of the reflex sight of FIG. 1.
Figure 5:
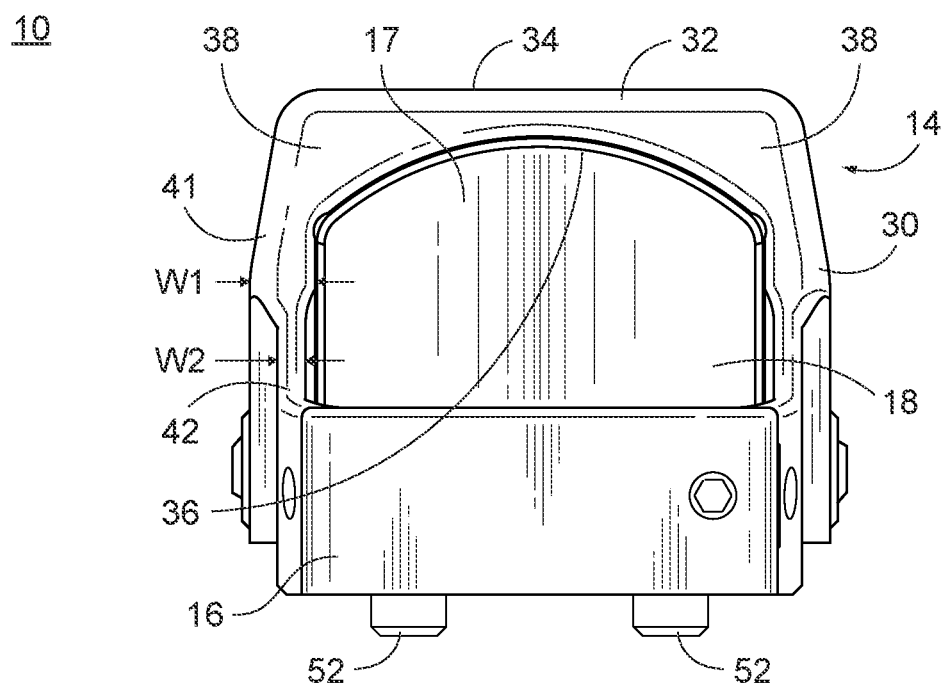
FIG. 5 is an elevation end view from the handle/user of the reflex sight of FIG. 1.

As illustrated in FIGS. 4-5, frame 14 defines an opening 17 for mounting of the optical element 18 therein. Frame 14 is designed to provide support for the optics 18, to protect the optics 18 from damage in the case of drop or impact of the sight 10, and provide shielding from glare. The frame 14 includes side walls 30 extending upwardly from left and right sides of the base portion 16 and an upper portion 32 extending substantially horizontally between side walls 30. Upper portion 32 includes a substantially flat upper surface 34 and a curved lower surface 36 that defines the top side of the opening 17. At the locations of intersection of the side walls 30 and the upper portion 32 are defined enlarged corner portions 38. In some embodiments, the corner portions 38 are solid. In some embodiments, the corner portions 38 are hollow and optionally filled with rubber, polymer, or other shock-absorbing material.

As shown in FIG. 8, the upper portion 32 extends forwardly beyond the top portion of the optics 18 to define a hood portion 40. The hood portion 40 shields the optics from the elements and glare.

Figure 2:
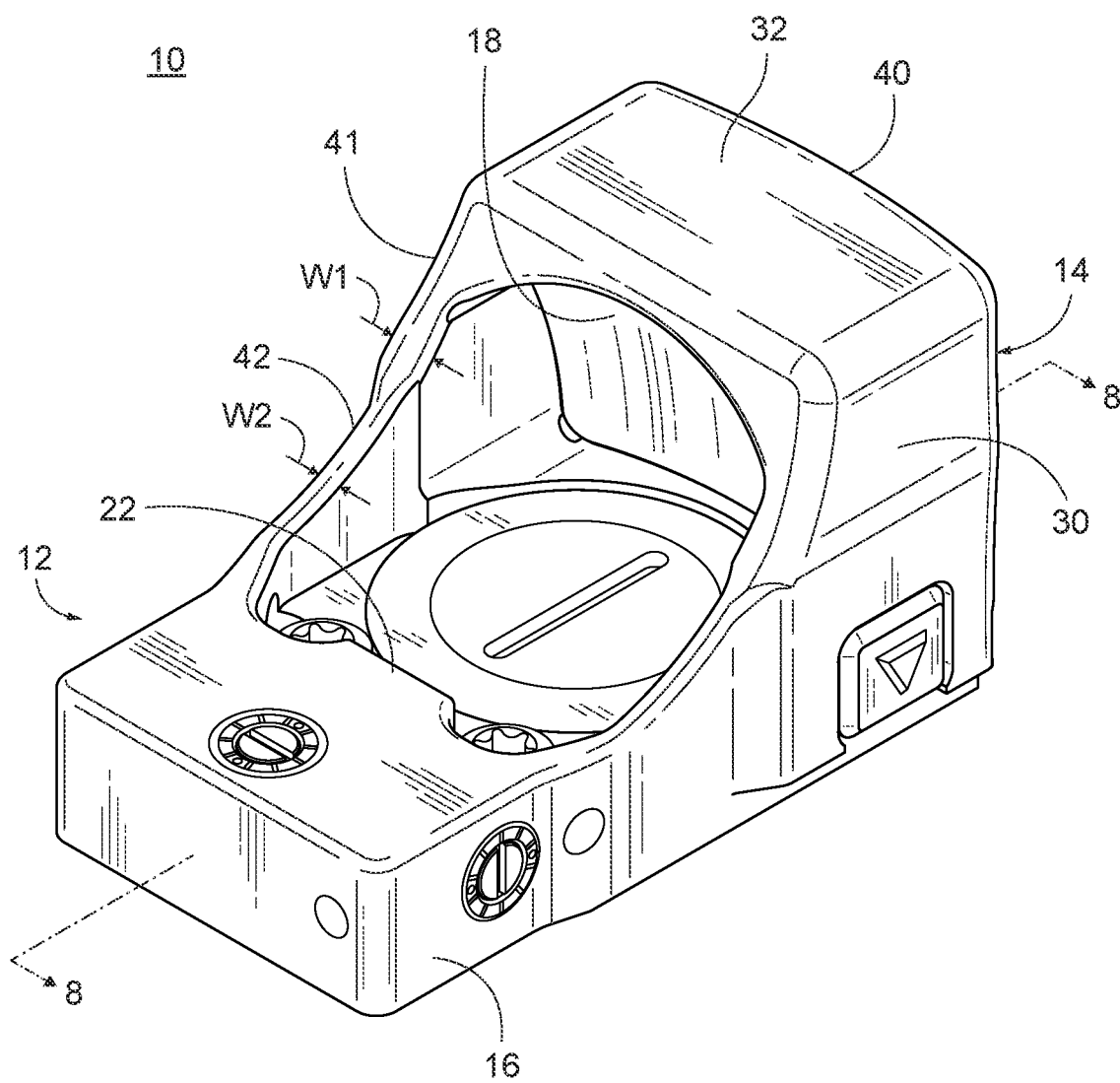
FIG. 2 is a top perspective view from the handle/user end of the reflex sight of FIG. 1.
Figure 6:
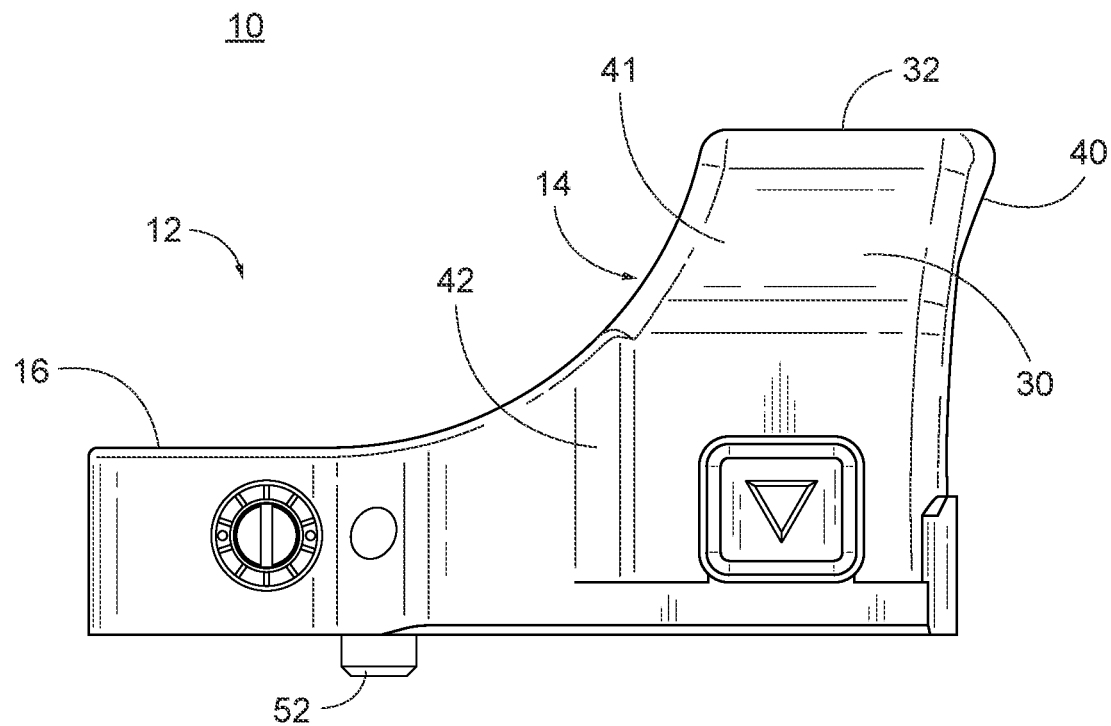
FIG. 6 is a side view of the reflex sight of FIG. 1.
Figure 7:
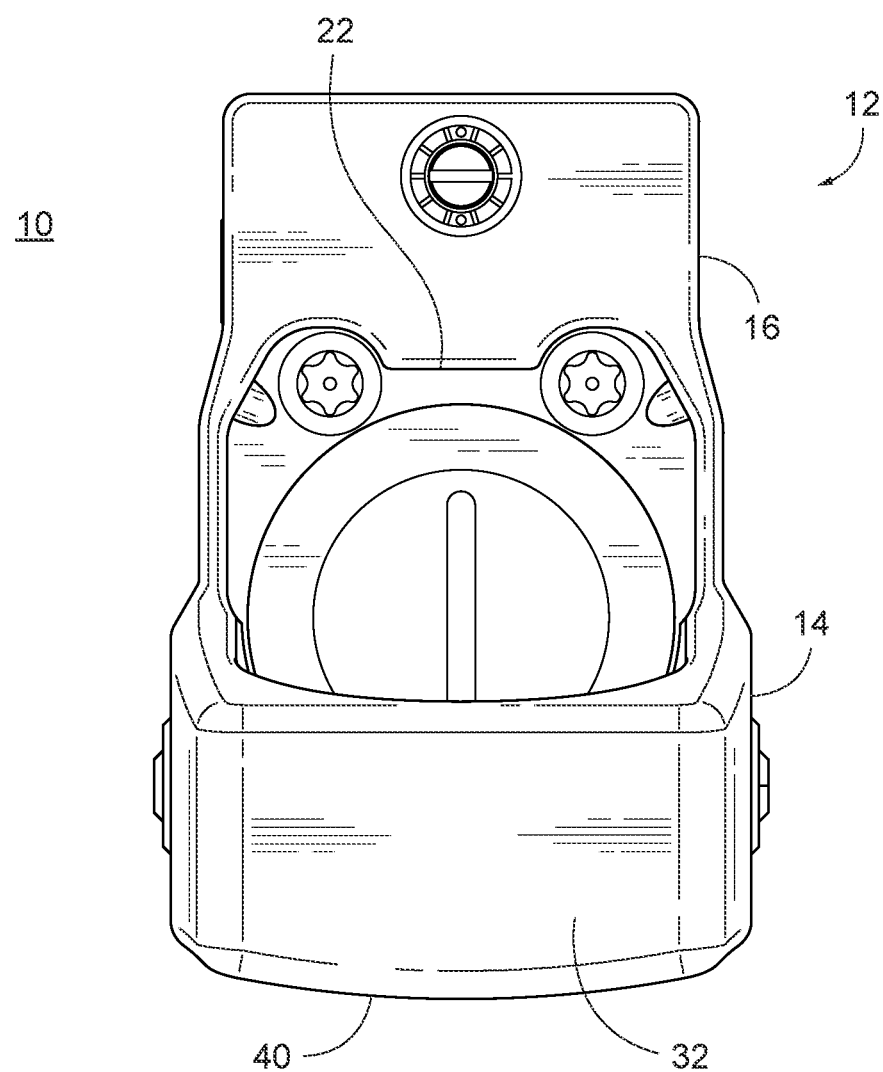
FIG. 7 is a top view of the reflex sight of FIG. 1.

As illustrated in FIGS. 2, 5 and 6, each of the side walls 30 include a forward wall portion 41 and a rear wall portion 42. In order to improve structural rigidity to the frame 14, the forward wall portions 41 have a width W1 that is greater than the width W2 of the rear wall portions 42. In combination, the curved surface 36, the enlarged corner portions 38, and the increased width of the forward wall portions 41 compared to the rear wall portions 42 contribute to increased strength of the frame 14. In embodiments, the forward wall portions 41 have a steeper slope than the slope of the rear wall portions 42. Stated another way, the rear wall portions 42 have a shallower slope than the forward wall portions 41. As shown in these figures, the slope of the side walls 30 may comprise a smooth curve in which the steeper slope of the forward wall portions 41 transitions smoothly to the shallower slope of the rear wall portions 42.

Figure 3:
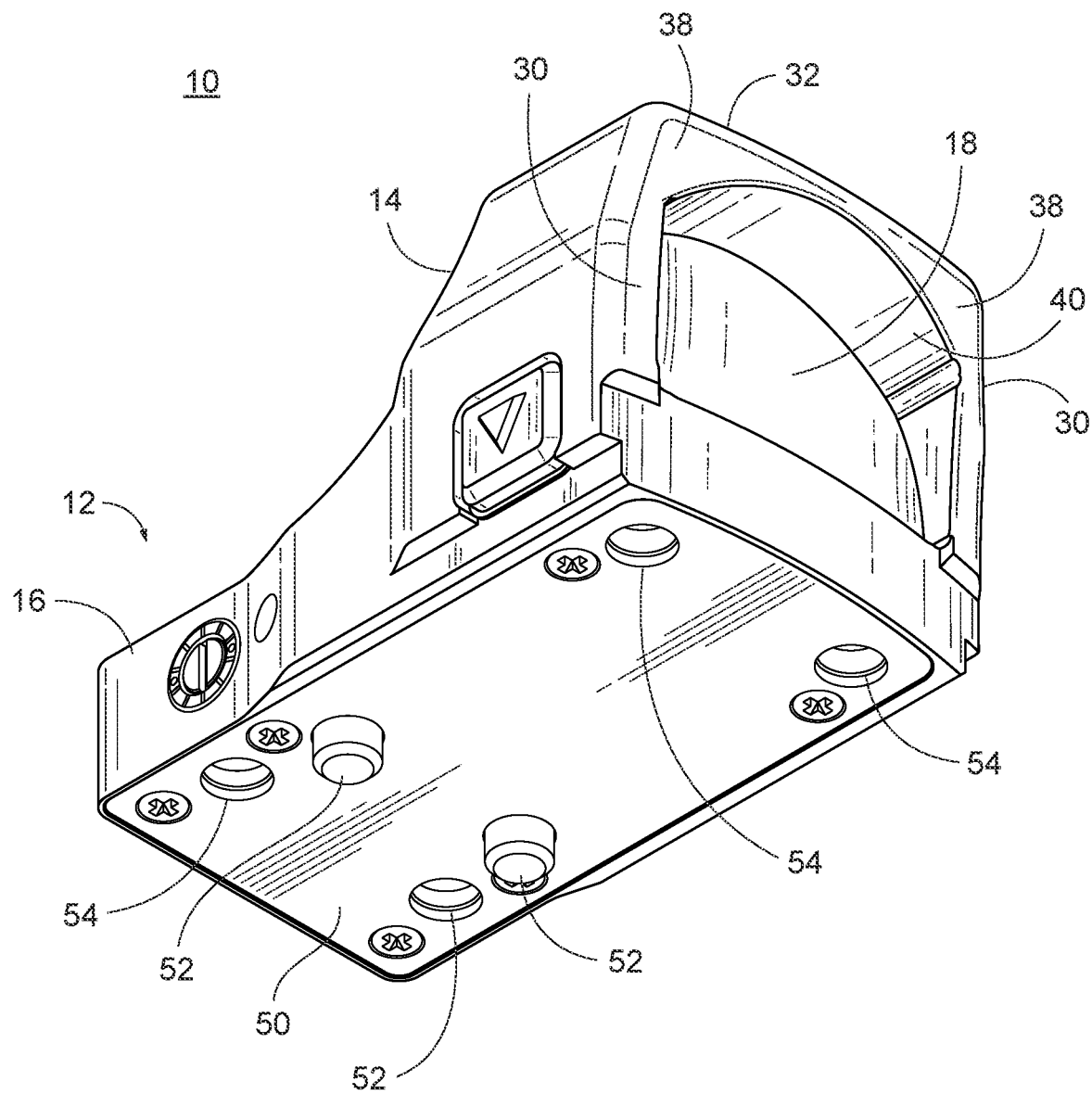
FIG. 3 is a bottom perspective view from the barrel end of the reflex sight of FIG. 1.

As illustrated in FIG. 3, the bottom surface 50 of the sight 10 is adapted for placement on the firearm. Two or more posts 52 and apertures 54 are configured to removably attach the housing 12 to the firearm. The surface 50 may be flat or curved to conform to the shape of the barrel of the firearm.

Figure 9:
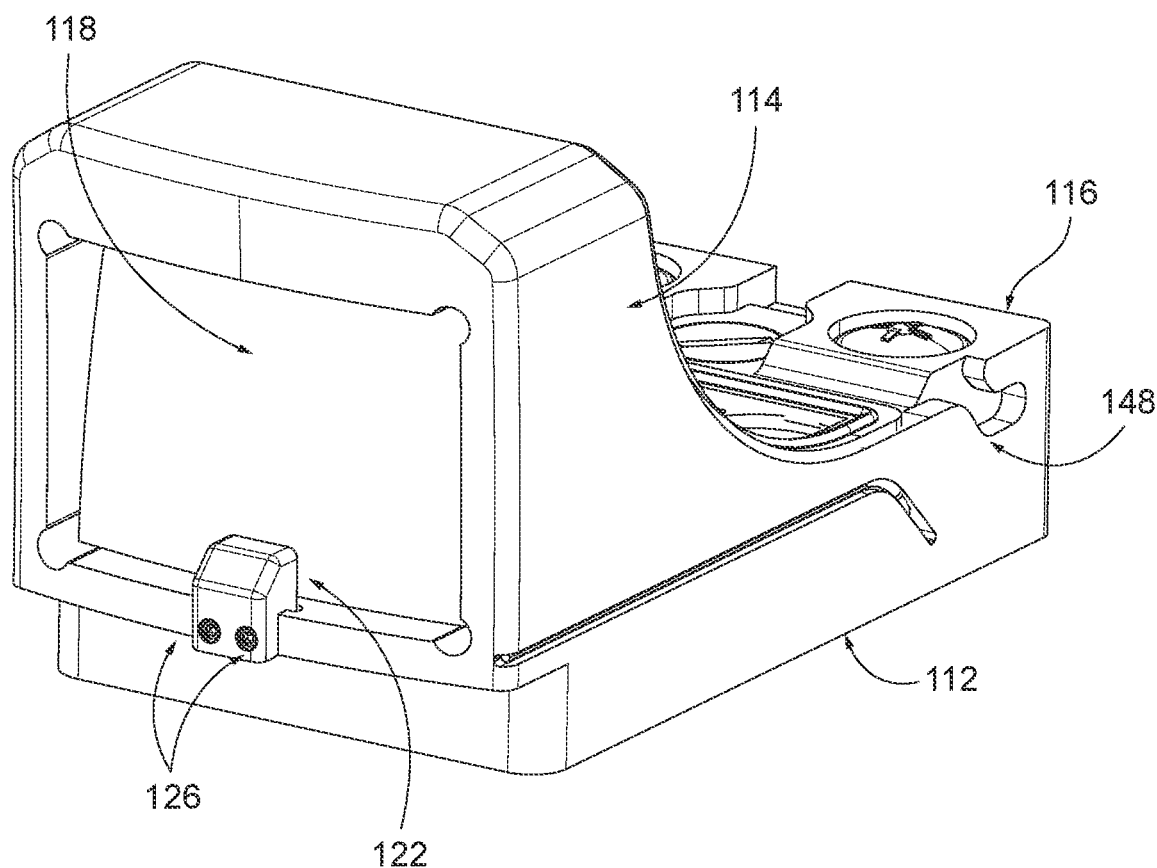
FIG. 9 is a perspective view from barrel end of a reflex sight in accordance with an exemplary embodiment of the disclosed subject matter.
Figure 10:
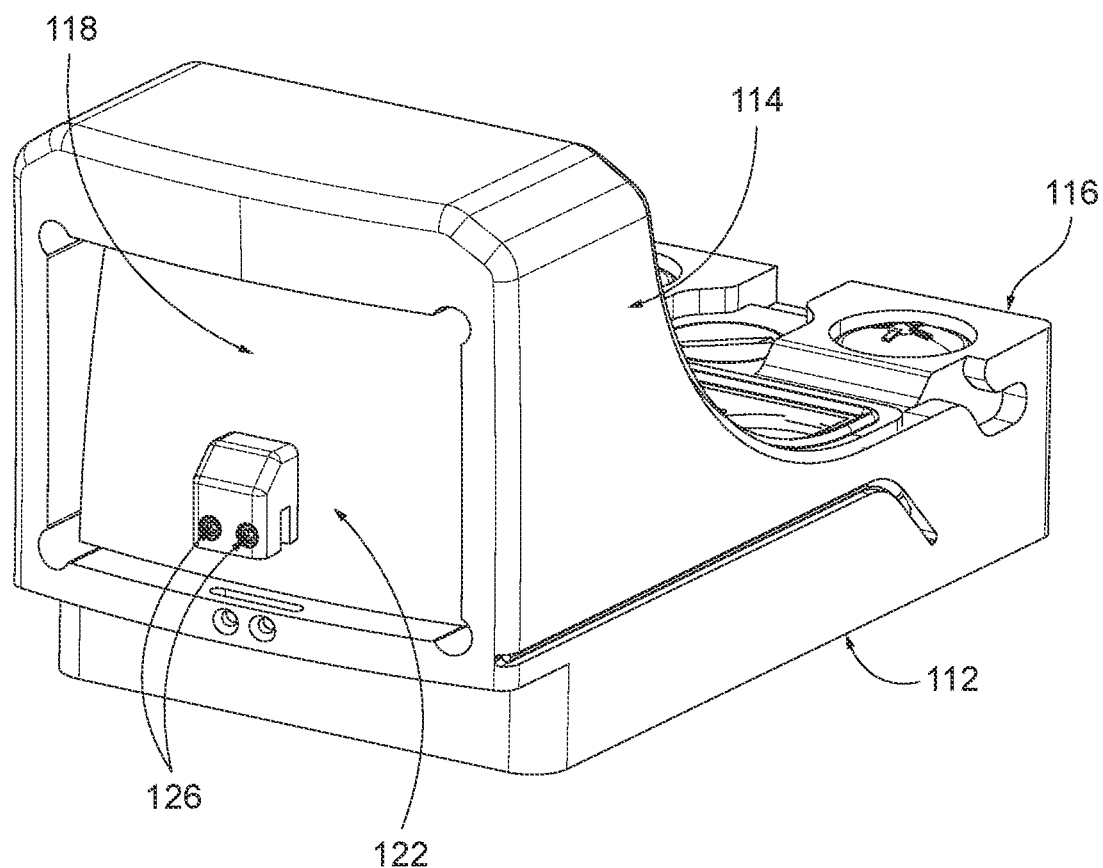
FIG. 10 is a perspective view from barrel end of the reflex sight of FIG. 9, illustrating the front post sight removed from the reflex sight.

FIG. 9-15 illustrate a reflex sight 110 in accordance with an exemplary embodiment, for mounting to a handgun or other firearm (not shown). With reference to FIGS. 9-10, reflex sight 110 includes a body 112 that serves as a housing for electronics, an illumination device 120 (FIG. 13) such as an LED, and other devices. Body 112 includes an upwardly extending frame 114 forming a loop with a lower base portion 116 of body 112. An optical element 118 is mounted in a generally upright position in a forward portion of frame 114, providing a viewing window for a target field of view. Optical element 118 may be substantially the same as optical element 18 described above and shown in FIG. 8. Light emitted from the illumination device 120 directed at a focal point rearward of lens 118 and within the base portion 116 of body 112 is reflected rearward toward the user's eye by a dichroic reflection layer or coating of lens 118 as collimated light, so that the user perceives the reflected light as an illuminated aiming mark superimposed on the field of view at infinite distance.

Figure 17:
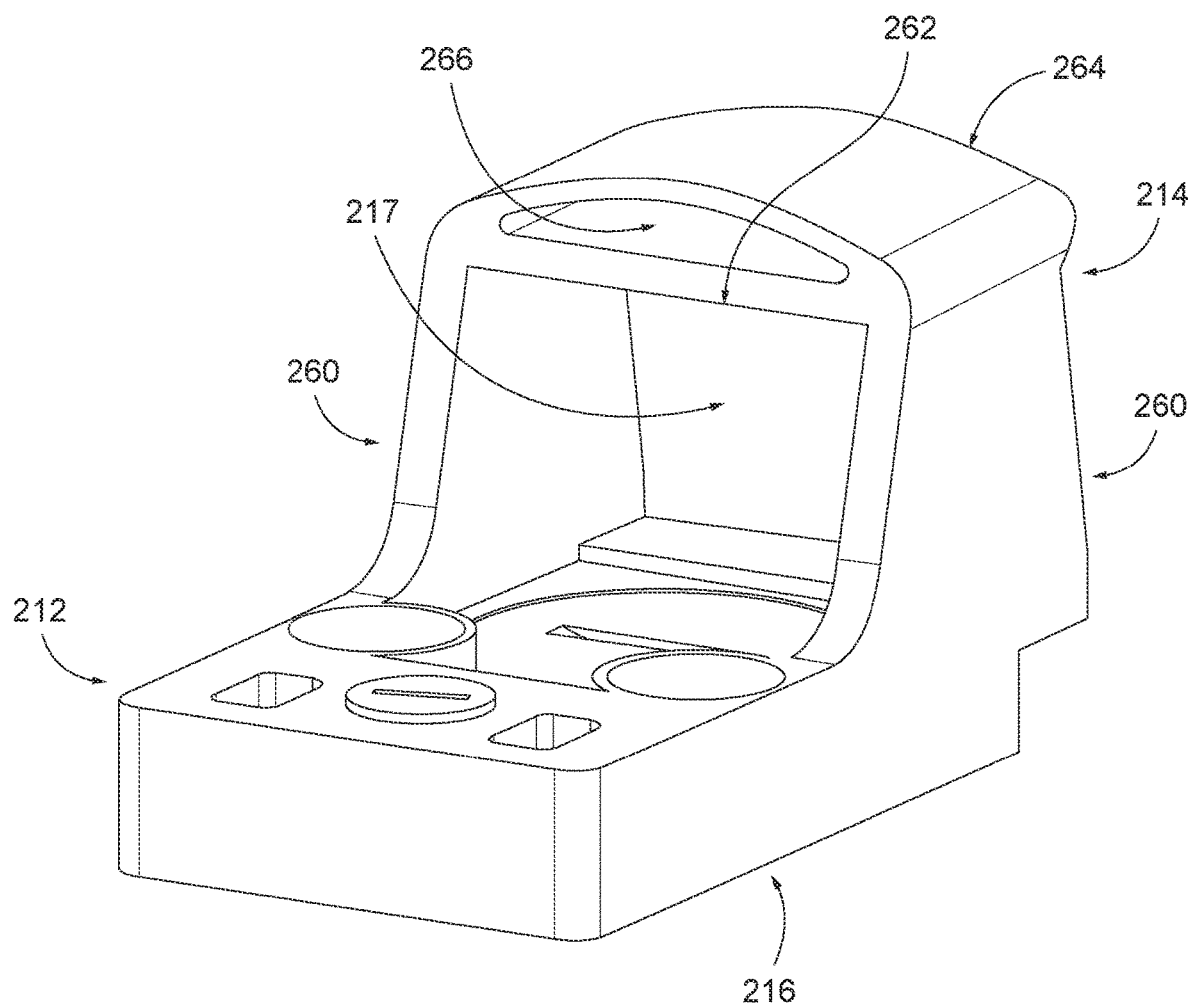
FIG. 17 is a perspective view from the handle/user end of a reflex sight in accordance with a second exemplary embodiment of the disclosed subject matter.

During operation of the handgun or other instrument, the reflex sight 110 may be subject to failure of certain components. For example, the optical element 118 may be damaged, or the illumination device, such as LED emitter, 120 may fail or lack battery power. Due to these failures, or at the preference of the user, the optical element 118 can be removed and an iron sight including a front post sight 122 and rear sight 124 may be used to aim at a target. As illustrated in FIGS. 9 and 10, front post sight 122 is positioned at a forward end of the sight 110. The front post 122 may be removably secured to the base 116 via screws 126. As illustrated in FIG. 17, front post 122 may include an aiming dot 128 provided with a luminescent material, such as photo luminescent paint, tritium or other materials.

Figure 11:
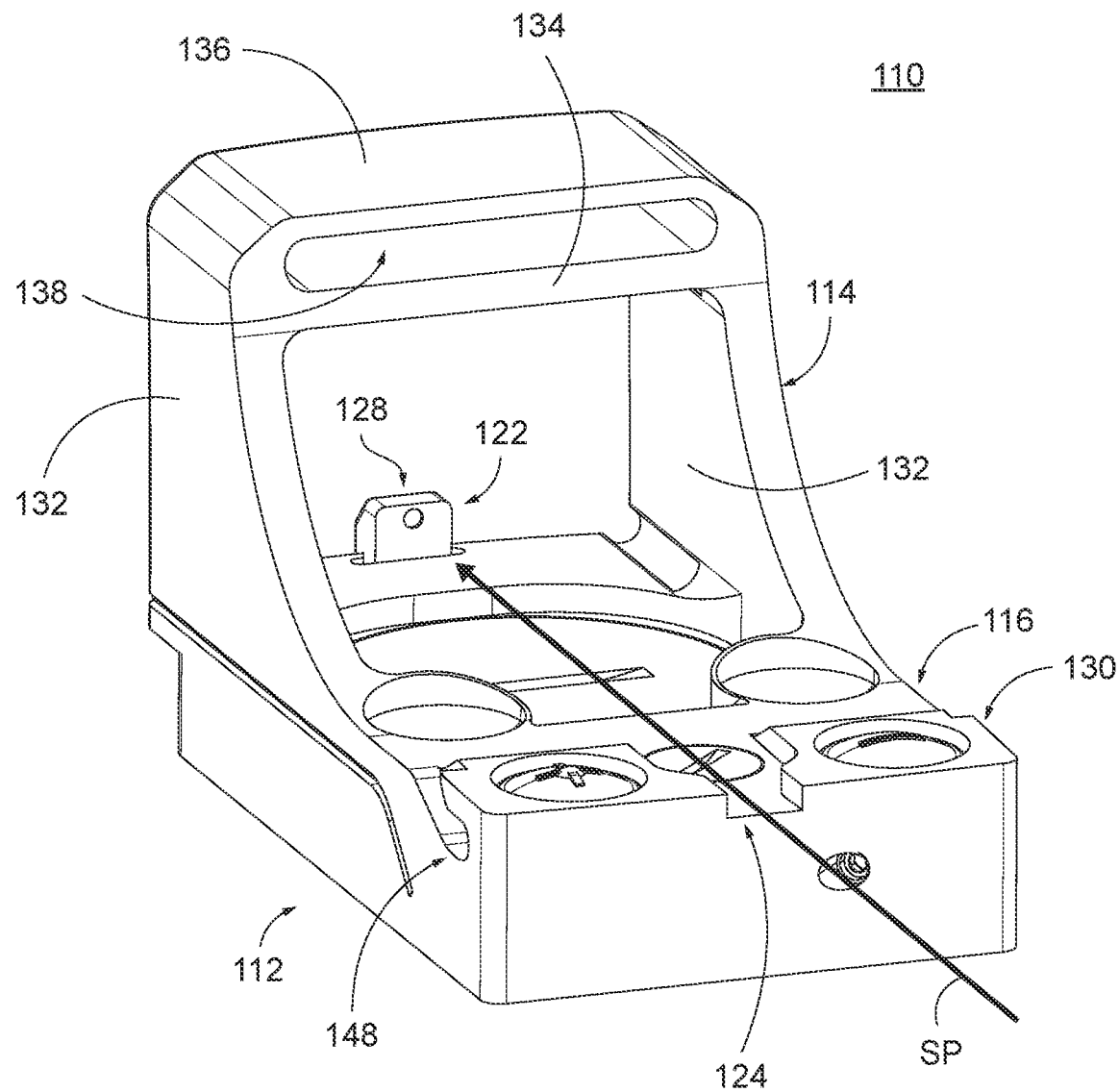
FIG. 11 is a perspective view from handle/user end of the reflex sight of FIG. 9, illustrating the rear sight configuration.
Figure 12:
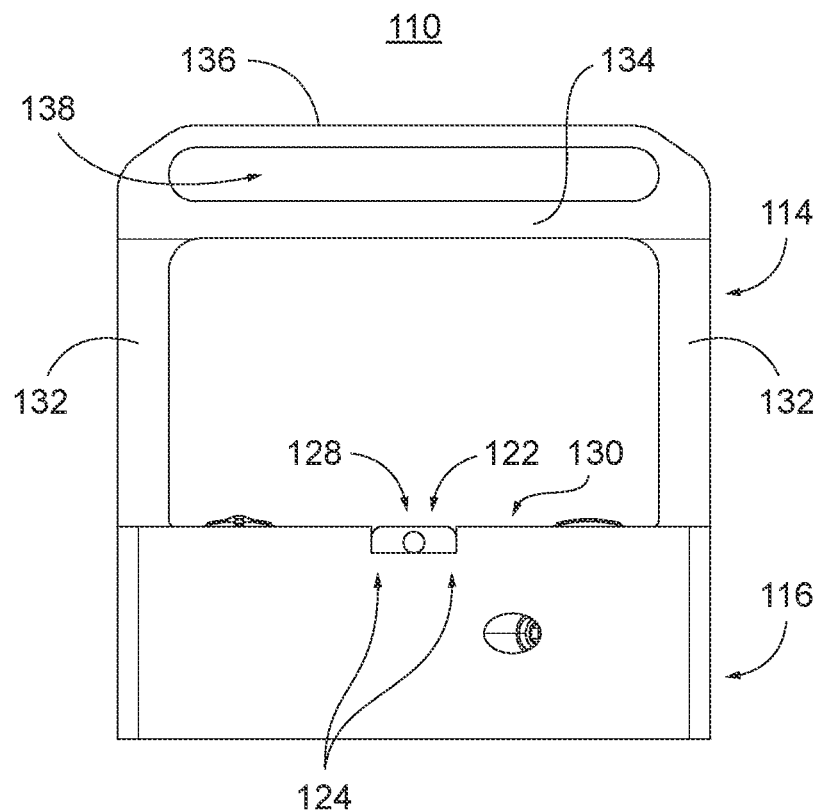
FIG. 12 is a rear view from handle/user end of the reflex sight of FIG. 9, illustrating the front post sight visible from the rear sight.

FIGS. 11-12 illustrate rear sight 124, which is used in conjunction with front post sight 122. Optical element 118 has been removed from the sight 110 in FIG. 11. Rear sight 124 is provided as a cut-out or recessed channel in the upper surface 130 of the base portion 116 of body 112. This rear sight cut out 124 allows the user to easily align the firearm (e.g. pistol) to the target. The rear sight 124 also aids in acquiring the red dot quickly. This cut out 124 is aligned with the front post sight 122, along sight path SP. Cut out 124 is located at the rear of the housing 112. If the user is not aligned with cutout 124 they will not have a clear picture of the front sight. Although shown in an embodiment of the sight 110, the iron sight comprising the front sight 122 and rear sight 124 is also envisioned on any of the other embodiments of the optical sights disclosed herein.

FIGS. 11-12 also show that the frame 114 defines upstanding side walls 132, a crossbar 134 and an upper surface 136, the crossbar 134 and the upper surface 136 defining a cavity 138 therebetween. The cavity 138 provides a relief area that may be empty or filled with rubber or urethane. The combination of the upper surface 136 and the cavity 138 absorbs shock in the case of an impact. The optional addition of rubber or urethane provides additional shock absorbing capability.

Figure 13:
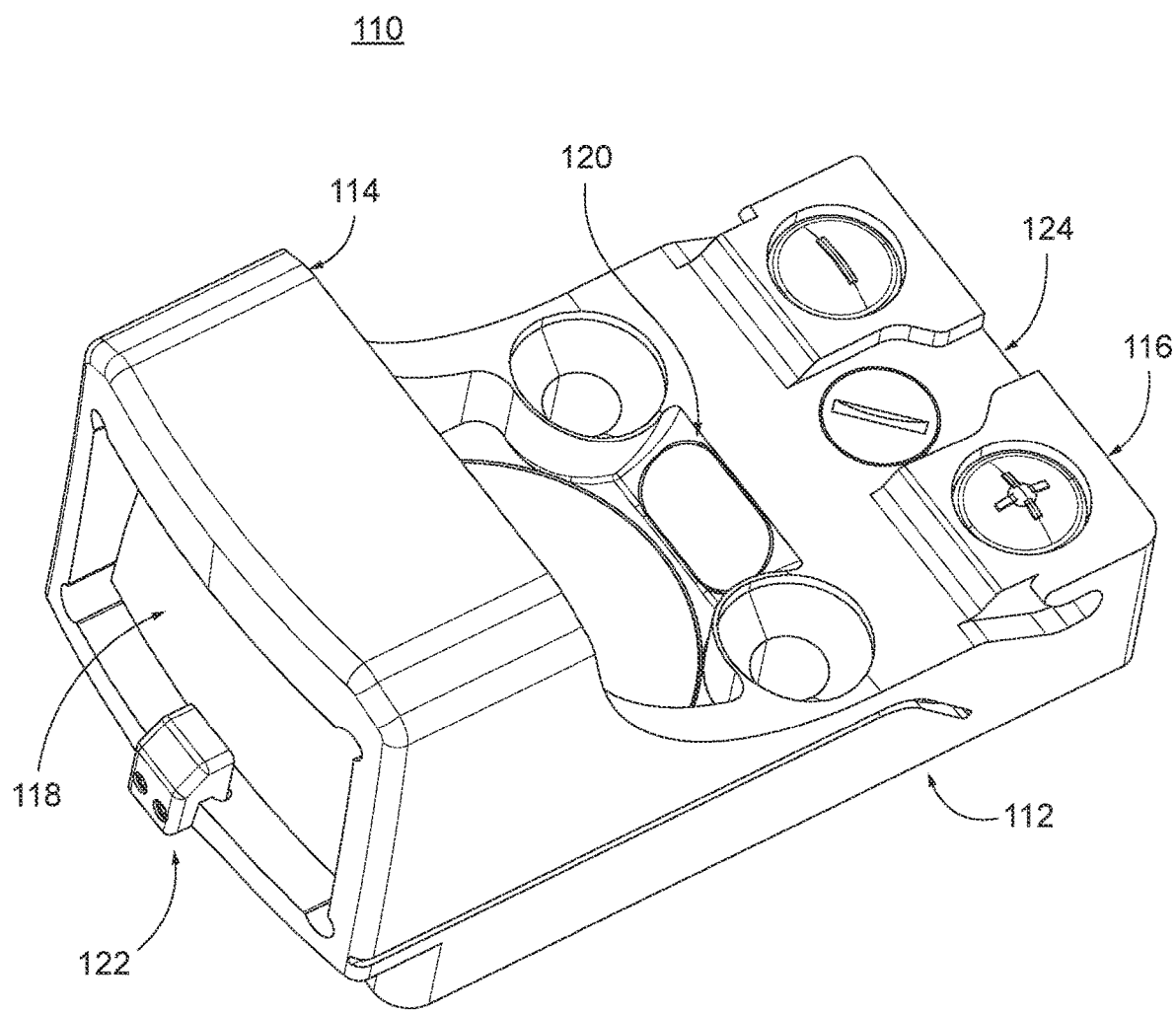
FIG. 13 is a perspective view from above of the reflex sight of FIG. 9, illustrating the LED emitter having an angled window.

FIG. 13 illustrates the window 120 of the illumination device, which is seated in an angled cutout on the housing 112. The surface of the window 120 forms an oblique angle with the horizontal surface 130, such as from a lower limit of 100 to an upper limit of 130, 135 or 140 degrees, for example from 100 to 120 degrees, or from 120 to 135 degrees. The window 120 is seated flush with the surrounding surface of the housing. Having an angled window prevents dirt and debris from settling in this area. This window will also have EXO Barrier™ lens coating to protect the window 120 of the LED.

Figure 14:
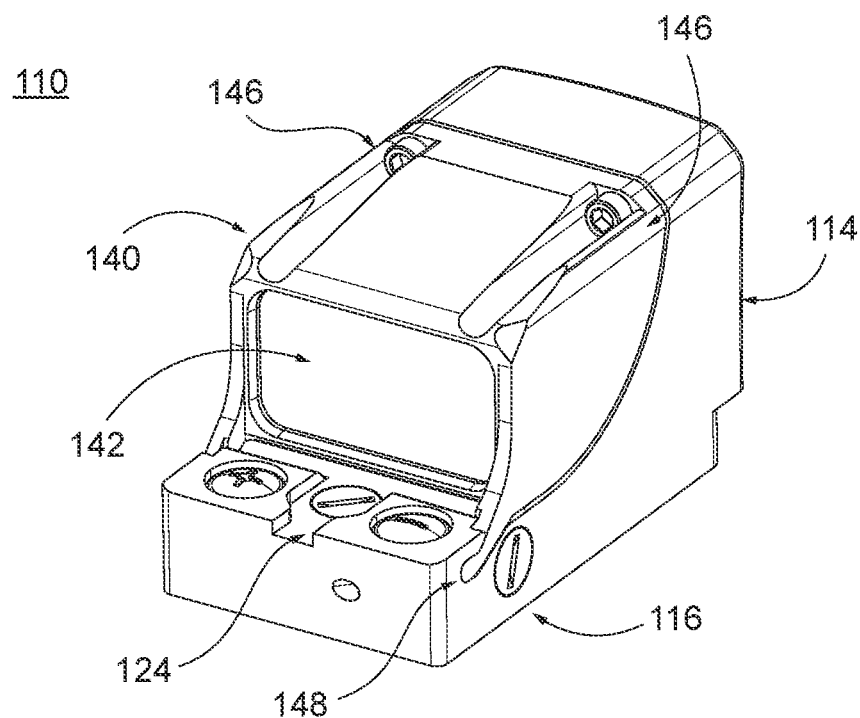
FIG. 14 is a perspective view from handle/user end of the reflex sight of FIG. 9, having a removable hood positioned thereon.
Figure 15:
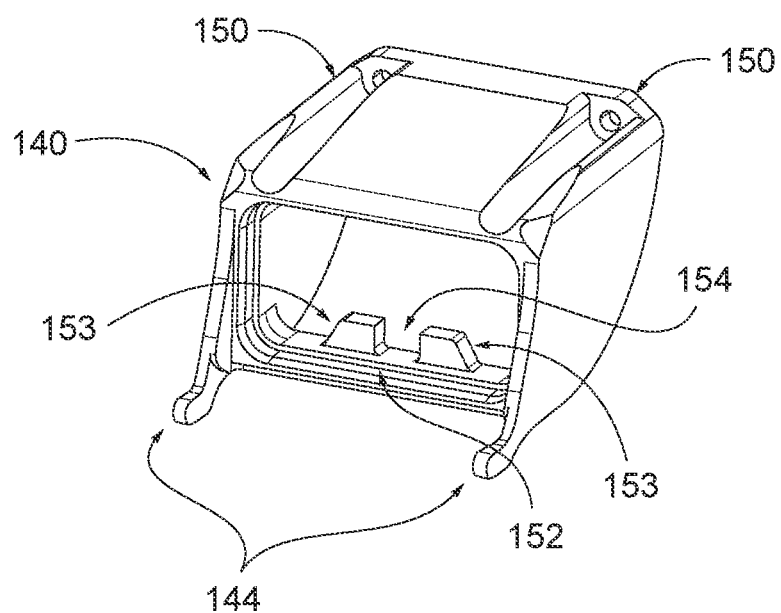
FIG. 15 is a perspective view of the hood of the reflex sight of FIG. 14 removed from the sight.

With reference to FIGS. 14-15, reflex sight 110 includes optional removable accessories, including a removable hood 140 that can be secured to the reflex sight 110. Removable hood 140 includes a clear protective window 142 that provides protection of the LED window 120 and rear portion of the objective lens 118. In one embodiment, hood 140 is mounted to the sight 110 via cam locks 144 and set screws 146. As shown in FIG. 14, cam locks cam locks 144 of hood 140 are received in cam lock recesses 148 provided in the base portion 116 of the body 112. Socket head screws 146 are provided through recesses 150 having apertures in the hood 140 and secured with corresponding threaded holes in the frame 114.

As shown in FIG. 15, removable hood 140 includes an integrated iron sight 152. In some embodiments, iron sight 152 is provided inside the protective window 142. In FIG. 15, the protective window is removed to show the internal iron sight more clearly. In other embodiments, iron sight 152 is provided outside the protective window 142. The iron sight 152 is aligned with, or provides an extension of the channel forming the rear sight 124. It includes a pair of upstanding flanges 153 defining a notch 154 therebetween. Although shown in an embodiment of the sight 110, the hood 140 is also envisioned on any of the other embodiments of the optical sights disclosed herein.

Figure 16:
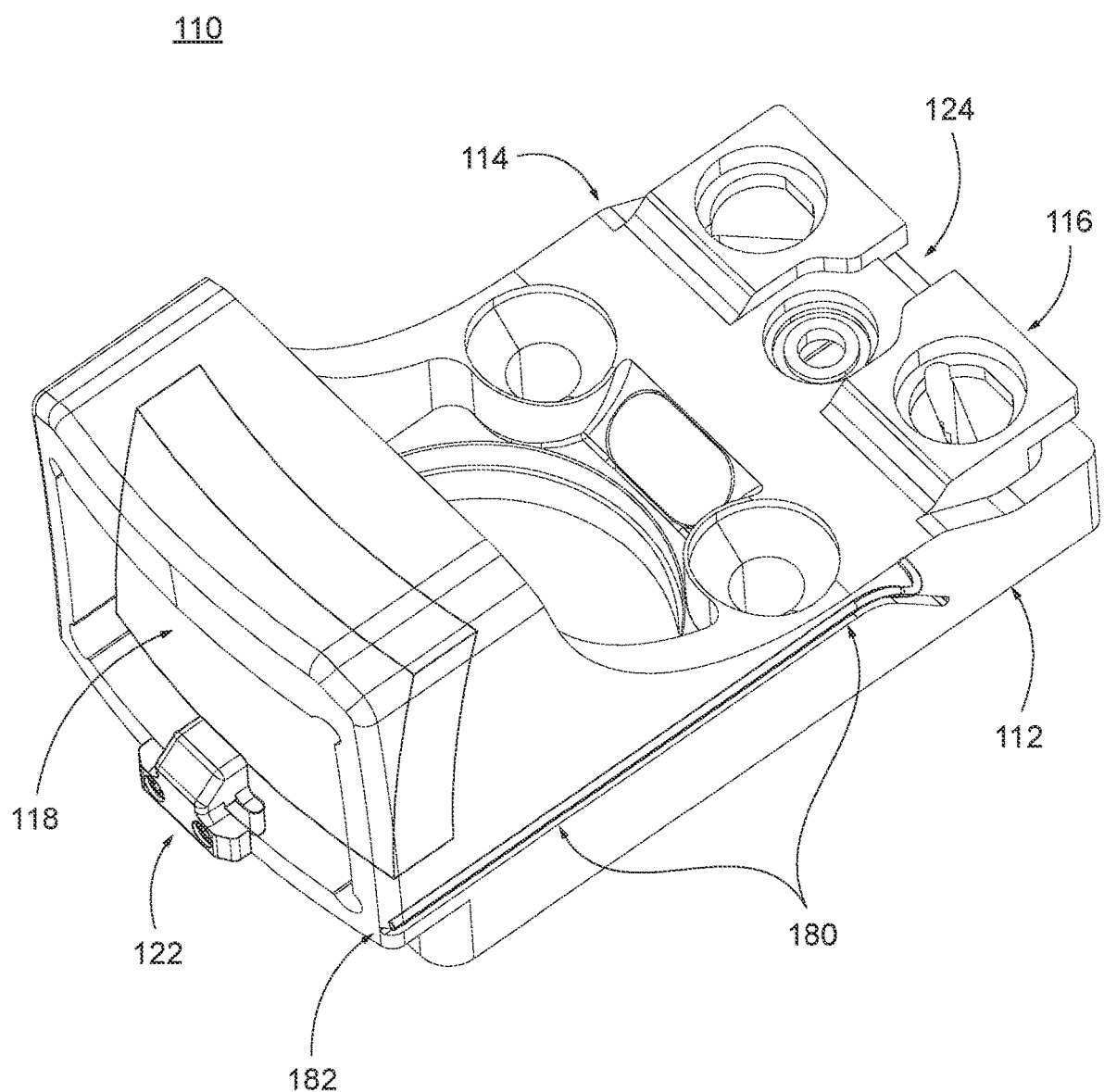
FIG. 16 is a perspective view from barrel end of the reflex sight of FIG. 9, illustrating a light collection feature.

FIG. 16 illustrates a light collection fiber, such as an optic rod 180 mounted on the front (barrel end) of the body 112. The fiber 180 collects light received at an inlet 182 having an optional lens or optic, and light is redirected to a photo diode or other light sensor (not shown). These components electrically regulate the brightness intensity of the red dot. Having a fiber optic rod 180 forward of the body 112 allows for the collection of light as it is received by the user. This allows the sight 110 to properly adjust the brightness of red dot projected by the illumination source based on the lighting environment forward of the unit as viewed by the inlet location 182. This configuration is useful where there is a disparity between the brightness at the target and at the user location, e.g., a dark ambient environment with a flashlight directed at the target site. In such case, a sensor located near the LED source may excessively dim the aiming point since the light conditions near the sensor are dark. The sight 110 having the inlet 182 at the forward portion of the body 112 would result in a brighter aiming point that is more visible in keeping with the brighter target area. Although shown in an embodiment of the sight 110, the light collection fiber including the optic rod 180 is also envisioned on any of the other embodiments of the optical sights disclosed herein.

Figure 18:
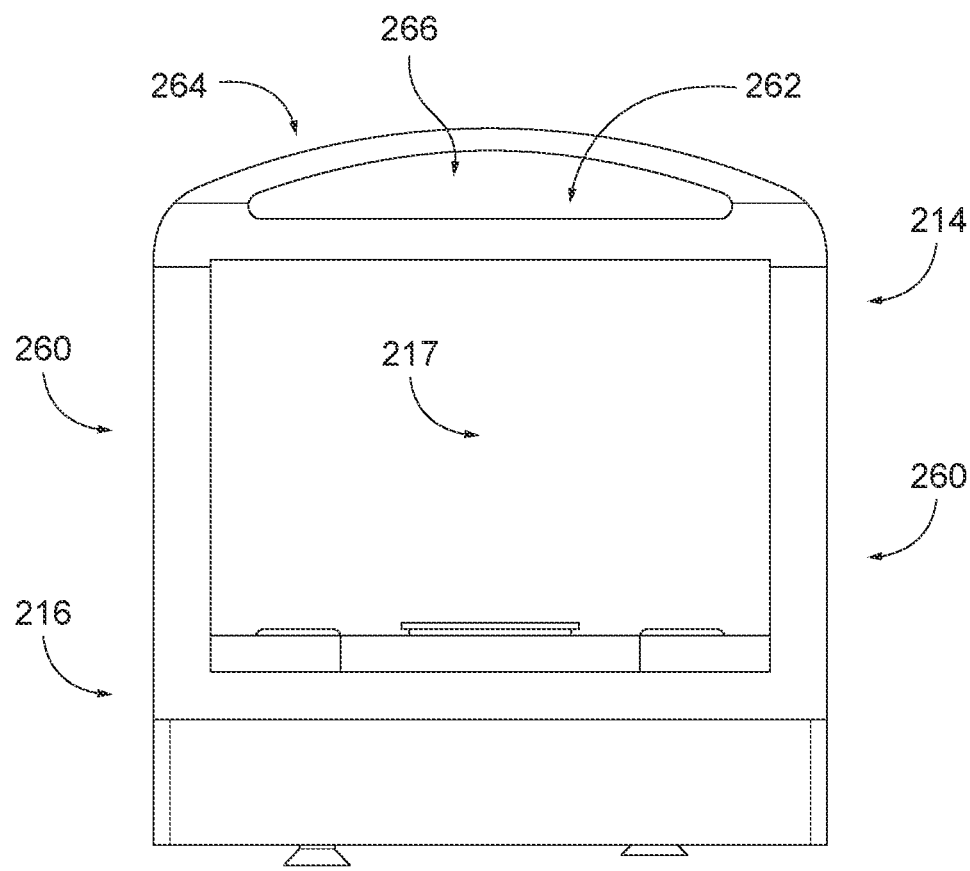
FIG. 18 is a rear view from the handle/user end of a reflex sight of FIG. 17.

FIG. 17-18 illustrate a reflex sight 200 in accordance with another exemplary embodiment, for mounting to a handgun or other firearm (not shown). Reflex sight 200 is substantially the same as sight 10 or 110 with the significant differences noted herein. With reference to FIGS. 17-18, reflex sight 200 includes a body 212 that serves as a housing for electronics, LED emitter and other devices. Body 212 includes an upwardly extending frame 214 forming a loop with a lower base portion 216 of body 212. An optical element (not shown), which may be substantially similar to optical element 18, is mounted in a generally upright position in a substantially rectangular opening 217 at a location at the forward portion of frame 214, providing a viewing window for a target field of view. As with the sight 110, light emitted from LED (not shown) positioned at a focal point rearward of lens and within base portion 216 of body 212 is reflected rearward toward the user's eye by a dichroic reflection layer or coating of the optical element as collimated light, so that the user perceives the reflected light as an illuminated aiming mark superimposed on the field of view at infinite distance.

The frame 214 defines a substantially rectangular space 217 for the optical element. The frame 214 includes side walls 260 and an upper portion that includes an outer surface 264 and a substantially horizontal member 262 that defines the top side of the space 217. In some embodiments, a relief area 266, such as cavity or recess, is formed or machined between the outer surface 264 and the horizontal member 262. The outer surface 264 may be curved, faceted (as shown in FIGS. 16-17), or triangular. The relief area 266 has a semi-circular, triangular or elliptical shape, with the center portion having a greater height than the side portions. The relief area 266 may be empty or filled with rubber or urethane. The combination of the curved outer surface 264 and the relief area 266 absorbs shock in the case of an impact. The optional addition of rubber or urethane provides additional shock absorbing capability.

Figure 19:
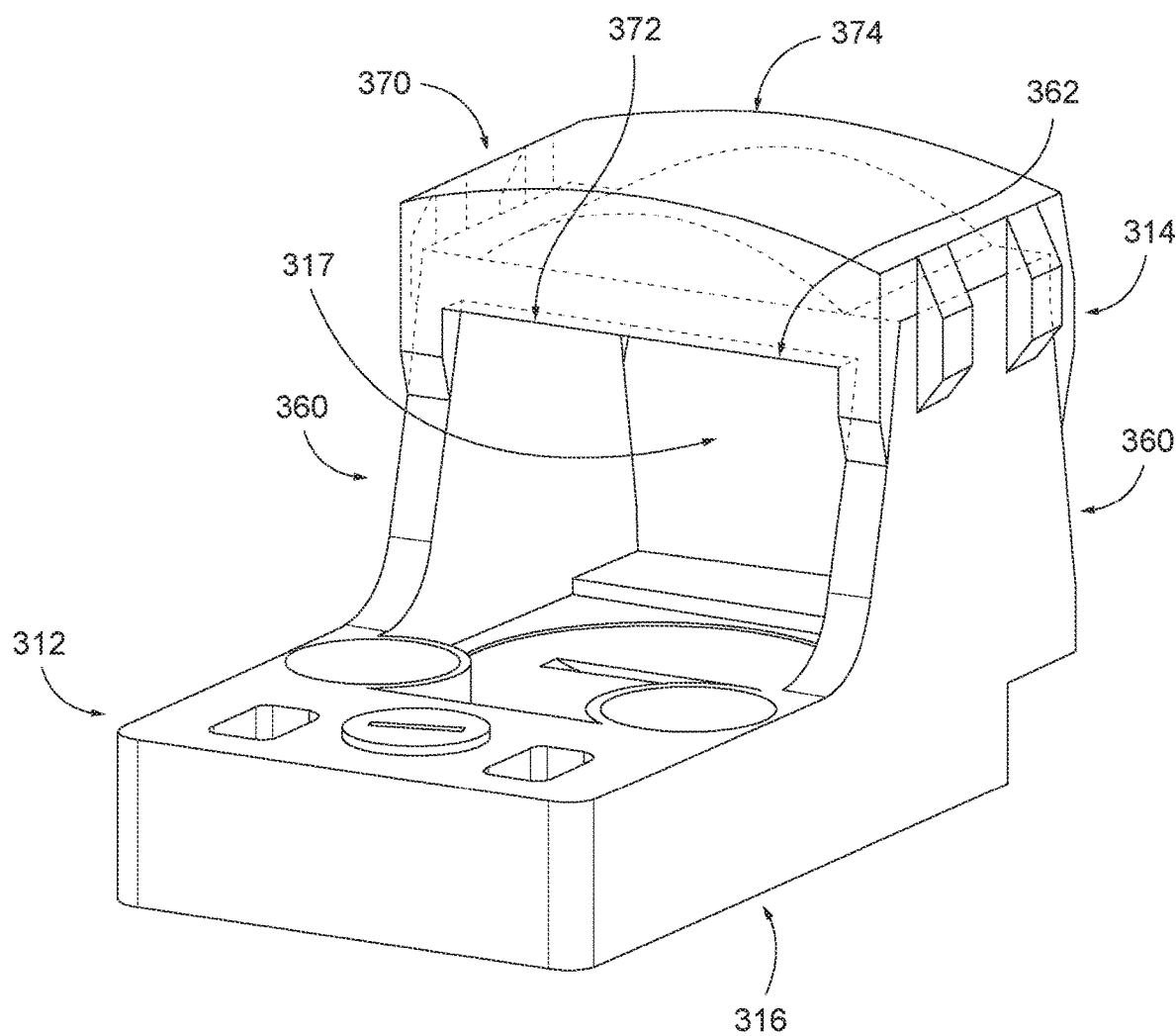
FIG. 19 is a perspective view from the handle end of a reflex sight in accordance with a third exemplary embodiment of the disclosed subject matter.
Figure 20:
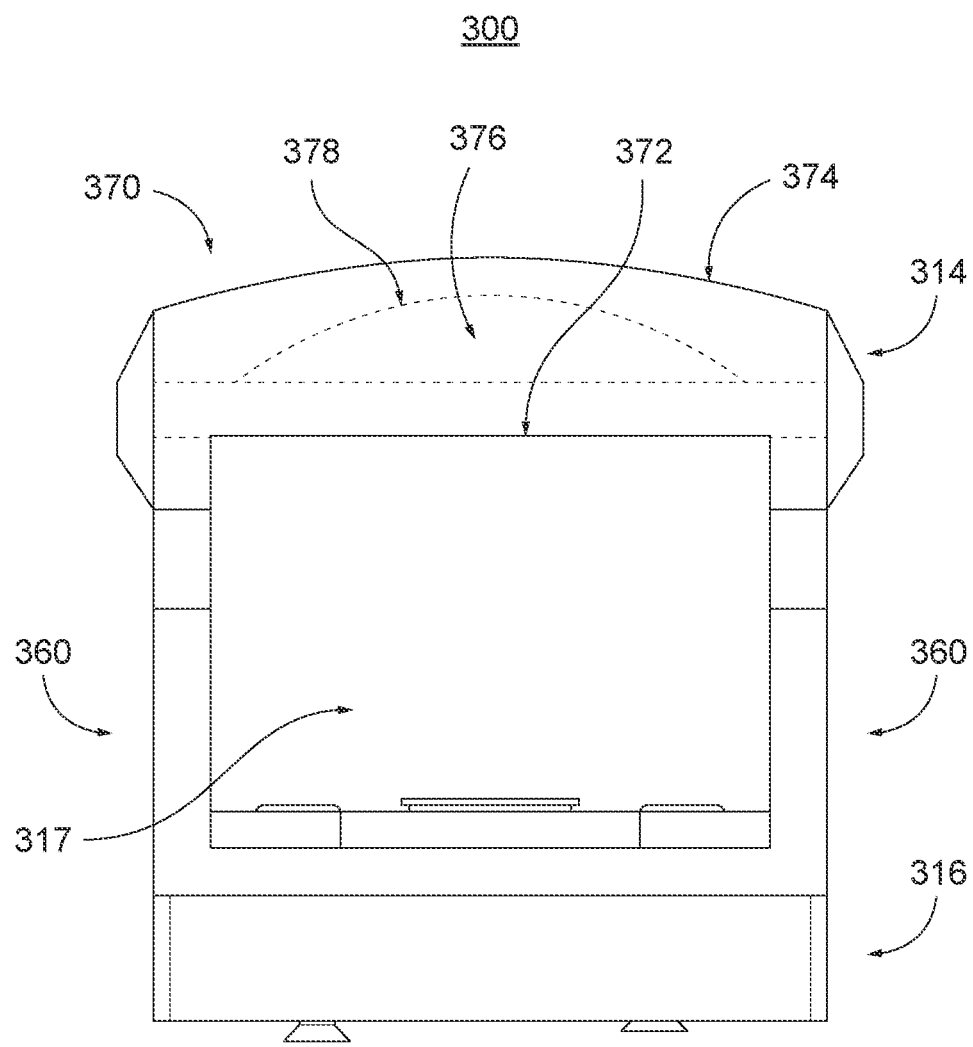
FIG. 20 is a rear view from the handle end of a reflex sight of FIG. 19.

FIG. 19-20 illustrates a reflex sight 300 in accordance with another exemplary embodiment, for mounting to a handgun or other firearm (not shown). Reflex sight 300 is substantially the same as sights 10, 110 and 200, with the significant differences noted herein. With reference to FIGS. 19-20, reflex sight 300 includes a body 312 that serves as a housing for electronics, LED emitter and other devices. Body 312 includes an upwardly extending frame 314 forming a loop with a lower base portion 316 of body 312. An optical element (not shown), which may be substantially similar to optical element 18, is mounted in a generally upright position in a substantially rectangular opening 217 at a location at the forward portion of frame 314, providing a viewing window for a target field of view. As with the sights 10, 110 and 200, light emitted from LED (not shown) positioned at a focal point rearward of lens and within base portion 316 of body 312 is reflected rearward toward the user's eye by a dichroic reflection layer or coating of lens as collimated light, so that the user perceives the reflected light as an illuminated aiming mark superimposed on the field of view at infinite distance.

The frame 314 provides a substantially rectangular space 317 for the optical element defined in part by a pair of upstanding side walls 360 and an upper crossbar 362. The top surface of the frame 314 (above crossbar 362) is substantially flat. A frame hood 370 is provided on top of the frame 314. In some embodiments, the frame hood 370 is fabricated from plastic, or lightweight metal. The frame hood 370 may snap onto frame 314 by interference fit, or it may be glued or welded to the frame 314. The frame hood 370 can include a horizontal edge or lip 372 in order to avoid interfering with the optical sight disposed in the space 317. The upper portion of hood 370 defines an upper surface 374 having a convex, blister, or pyramidal shape. A relief area 376, such as cavity or recess (shown in FIG. 20), is defined between the frame hood 370 and the top surface of the frame 314. In some embodiments, the relief area 376 has an arch, dome or pyramidal shape, with the center portion having a greater height than the side portions. The relief area 376 may be empty or filled with rubber or urethane. The combination of the curved upper surface 374 of hood 370 and the relief area 376 absorbs shock in the case of an impact. The optional addition of rubber or urethane provides additional shock absorbing capability. As shown in FIG. 20, the frame hood 370 may further include an inner wall 378 that defines an internal arch to redistribute the impact load to the side posts 360.

Embodiments of the optical sights include the following.

Embodiment 1. An optical reflex sight for mounting on a firearm comprising: a base defining a barrel end and a rear end; a frame extending upwardly from the base at the barrel end and defining an opening; an optical element received in the opening; an illumination device operable to display an aiming point on the optical element to generate said aiming point; and an iron sight comprising a forward post sight mounted at the barrel end of the base; and a rear sight defined by a channel recessed an upper surface of the base at the rear end of the base and aligned with the forward post sight.

Embodiment 2. The optical sight of Embodiment 1, further comprising a hood adapted to removably cover a rear-facing side of the optical element and the illumination device, the hood comprising a transparent panel for viewing the optical element therethrough.

Embodiment 3. The optical sight of Embodiment 2, the hood further comprising an iron sight.

Embodiment 4. The optical sight of Embodiment 3, wherein the iron sight is disposed inside the transparent panel.

Embodiment 5. The optical sight of Embodiment 3, wherein the iron sight is disposed outside the transparent panel.

Embodiment 6. The optical sight of Embodiment 3, wherein the iron sight is substantially aligned with the channel of the rear sight.

Embodiment 7. The optical sight of Embodiment 2, wherein the hood is removably attached to the frame by screws and the hood is removably attached to the base by cam locks.

Embodiment 8. The optical sight of Embodiment 1, wherein the forward post sight is removable from the base.

Embodiment 9. The optical sight of Embodiment 8, wherein the forward post sight is secured to the base by screws.

Embodiment 10. The optical sight of Embodiment 1, further comprising an ambient light sensor controlling the brightness of the illumination device and an optical fiber connected to the sensor and having an inlet at the barrel end of the base.

Embodiment 11. An optical reflex sight for mounting on a firearm comprising: a base defining a barrel end and a rear end; a frame extending upwardly from the base at the barrel end and defining an opening, the frame defining upstanding side walls, a crossbar and an upper surface, the crossbar and the upper surface defining a cavity therebetween; an optical element received in the opening; and an illumination device operable to display an aiming point on the optical element to generate said aiming point.

Embodiment 12. The optical sight of Embodiment 11, wherein the upper surface of the frame defines a curved, faceted or triangular configuration.

Embodiment 13. The optical sight of Embodiment 11, wherein the cavity defines a center height greater than the height of the side portions.

Embodiment 14. The optical sight of Embodiment 11, wherein the cavity is filled with rubber or urethane.

Embodiment 15. An optical reflex sight for mounting on a firearm comprising: a base defining a barrel end and a rear end; a frame extending upwardly from the base at the barrel end and defining an opening, the frame defining upstanding side walls, and a crossbar extending between the side walls and defining a top surface of the frame; a frame hood for mounting over the top surface of the frame, the frame hood and the top surface defining a cavity therebetween; and an optical element received in the opening; an illumination device operable to display an aiming point on the optical element to generate said aiming point.

Embodiment 16. The optical sight of Embodiment 15, wherein the frame hood further comprising an arched internal wall to distribute an impact load to the side walls.

Embodiment 17. The optical sight of Embodiment 15, wherein the outer surface of the frame hood defines a dome-shaped, convex, pyramidal, or blister shape.

Embodiment 18. The optical sight of Embodiment 15, wherein the hood is fabricated of plastic or metal.

Embodiment 19. The optical sight of Embodiment 15, wherein the hood is secured to the top surface of the frame by interference fit, glue or welding.

Embodiment 20. An optical reflex sight for mounting on a firearm comprising: a base defining a barrel end and a rear end; a frame extending upwardly from the base at the barrel end and defining an opening, the frame comprising a pair of side walls extending upward from the base comprising a forward wall portion having a first width and a rear wall portion having a second width, the second width smaller than the first width; and an upper wall extending between the side walls and defining a flat upper portion and a curved lower portion; an optical element received in the opening; and an illumination device operable to display an aiming point on the optical element to generate said aiming point Embodiment 21. The optical sight of Embodiment 20, wherein the upper wall extends towards the barrel end to define a hood adapted to partially shield the optical element.

The detailed description of aspects of the present disclosure set forth herein refers to the accompanying drawings, which show various embodiments by way of illustration. While these various embodiments are described in sufficient detail to enable those skilled in the art to practice the disclosure, it should be understood that other embodiments can be realized and that logical and mechanical changes can be made without departing from the spirit and scope of the disclosure. Thus, the detailed description herein is presented for purposes of illustration only and not of limitation. For example, the steps recited in any of the method or process descriptions can be executed in any order and are not limited to the order presented. Moreover, references to a singular embodiment can include plural embodiments, and references to more than one component can include a singular embodiment.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the foregoing description, it is understood that terms such as "first," "second," "third," "top," "bottom," "side," "above," "below," and the like, are words of convenience and are not to be construed as limiting terms unless expressly state otherwise. As used herein, the singular forms "a," "an," and "the" are intended to include the plural forms as well, unless the context clearly indicates otherwise. It will be further understood that the terms "comprises," "comprising," "having," "includes," "including," and/or variations thereof, when used herein, specify the presence of stated features, steps, operations, elements, and/or components, but do not preclude the presence or addition of one or more other features, steps, operations, elements, components, and/or groups thereof.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. An optical reflex sight for mounting on a firearm comprising:
    a base defining a barrel end and a rear end;
    a frame extending upwardly from the base at the barrel end and defining an opening;
    an optical element received in the opening; and
    an illumination device operable to display an aiming point on the optical element to generate said aiming point;
    wherein the frame comprises upstanding side walls and a top wall comprising an upper surface, a lower surface that contacts the optical, wherein the lower surface is curved, and one or more hollow cavities in the top wall between the upper and lower surfaces disposed within enlarged corner portions at the intersections of the side walls and the top wall.

2. The optical sight of claim 1, wherein the upper surface of the frame defines a curved, faceted or triangular configuration.

3. The optical sight of claim 1, wherein the one or more hollow cavities defines a center height greater than the height of the side portions.

4. The optical sight of claim 1, wherein the one or more hollow cavities is filled with rubber or urethane.

5. The optical sight of claim 1, wherein the frame defines upstanding side walls, and a crossbar extending between the side walls and defining a top surface of the frame; and further comprising a frame hood for mounting over the top surface of the frame, the frame hood and the top surface defining a cavity therebetween.

6. The optical sight of claim 5, wherein the frame hood further comprises an arched internal wall to distribute an impact load to the side walls.

7. The optical sight of claim 5, wherein the outer surface of the frame hood defines a dome-shaped, convex, pyramidal, or blister shape.

8. The optical sight of claim 1, further comprising an iron sight comprising
    a forward post sight mounted at the barrel end of the base; and a rear sight defined by a channel recessed in an upper surface of the base at the rear end of the base and aligned with the forward post sight.

9. The optical sight of claim 8, wherein the forward post sight is removable from the base.

10. The optical sight of claim 9, wherein the forward post sight is secured to the base by screws.

11. The optical sight of claim 1 further comprising
a hood adapted to removably cover a rear-facing side of the optical element and the illumination device, the hood comprising a transparent panel for viewing the optical element therethrough.

12. The optical sight of claim 11, the hood further comprising an iron sight.

13. The optical sight of claim 12, wherein the iron sight is substantially aligned with a rear sight defined by a channel recessed in an upper surface of the base at the rear end of the base.

14. The optical sight of claim 13, wherein the iron sight is disposed inside the transparent panel.

15. The optical sight of claim 13, wherein the iron sight is disposed outside the transparent panel.

16. The optical sight of claim 11, wherein the hood is removably attached to the frame by screws and the hood is removably attached to the base by cam locks.

17. The optical sight of claim 1 further comprising an ambient light sensor controlling the brightness of the illumination device and an optical fiber connected to the sensor and having an inlet at the barrel end of the base.

18. The optical reflex sight of claim 1, wherein the one or more cavities are filled with rubber, polymer or shock-absorbing material.

19. An optical reflex sight for mounting on a firearm comprising:
a base defining a barrel end and a rear end;
a frame extending upwardly from the base at the barrel end and defining an opening;
an optical element received in the opening; and
an illumination device operable to display an aiming point on the optical element to generate said aiming point;
wherein the frame comprises a pair of upstanding side walls extending upward from the base comprising a forward wall portion having a first width and a rear wall portion having a second width, the second width smaller than the first width; and
an upper wall extending between the side walls and defining a flat upper portion and a curved lower portion that contacts the optical element, and one or more hollow cavities in the upper wall between the upper portion and the curved lower portion in enlarged corner portions disposed at the intersections of the side walls and the top wall.

20. The optical sight of claim 19, wherein the upper wall extends towards the barrel end to define a hood adapted to partially shield the optical element.

21. An optical reflex sight for mounting on a firearm comprising:
a base defining a barrel end and a rear end;
a frame extending upwardly from the base at the barrel end and defining an opening;
an optical element received in the opening; and
an illumination device operable to display an aiming point on the optical element to generate said aiming point;
wherein the frame comprises side walls extending upwardly from the base portion and an upper portion extending substantially horizontally between side walls, the upper portion defining an upper surface and a curved lower surface that defines the top side of the opening, wherein intersections of the side walls and the upper portion define one or more cavities disposed within enlarged hollow corner portions between the upper and lower surfaces.

22. The optical reflex sight of claim 21, wherein the hollow corner portions are filled with rubber, polymer or shock-absorbing material.

23. The optical reflex sight of claim 21, wherein the upper portion extends forwardly beyond the optical element to define a hood portion.

24. The optical reflex sight of claim 21, wherein the side walls comprise a forward wall portion having a first width and a rear wall portion having a second width, wherein the first width is greater than the second width.

* * * * *